(12) United States Patent
MacNee, III

(10) Patent No.: US 7,100,964 B2
(45) Date of Patent: Sep. 5, 2006

(54) CONVERTIBLE ROOF SYSTEM

(75) Inventor: Arthur L MacNee, III, Southgate, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/924,336

(22) Filed: Aug. 23, 2004

(65) Prior Publication Data

US 2006/0038427 A1 Feb. 23, 2006

(51) Int. Cl.
*B60J 7/08* (2006.01)
(52) U.S. Cl. .................................. 296/117
(58) Field of Classification Search ............ 296/117, 296/107.01, 108–109, 112, 115, 121–122, 296/107.09, 107.16
See application file for complete search history.

(56) References Cited

U.S. PATENT DOCUMENTS

| | | | |
|---|---|---|---|
| 522,476 A | 7/1894 | Mayer | |
| 4,840,419 A | 6/1989 | Kolb | |
| 5,026,110 A | 6/1991 | Koop et al. | |
| 5,225,747 A | 7/1993 | Helms et al. | |
| 5,251,952 A | 10/1993 | Guckel et al. | |
| 5,451,849 A | 9/1995 | Porter et al. | |
| 5,467,596 A | 11/1995 | Yu | |
| 5,671,966 A * | 9/1997 | Busch | 296/107.16 |
| 5,682,807 A * | 11/1997 | Mentink | 91/530 |
| 5,772,274 A * | 6/1998 | Tokarz | 296/107.09 |
| 5,825,147 A | 10/1998 | Porter et al. | |
| 5,887,935 A * | 3/1999 | Sack | 296/122 |
| 6,114,819 A | 9/2000 | Porter et al. | |
| 6,246,199 B1 | 6/2001 | Porter et al. | |
| 6,288,511 B1 | 9/2001 | Porter et al. | |
| 6,312,041 B1 * | 11/2001 | Queveau et al. | 296/107.17 |
| 6,334,644 B1 | 1/2002 | Gurtler et al. | |
| 6,390,531 B1 | 5/2002 | Schutt | |
| 6,450,562 B1 | 9/2002 | Miklosi et al. | |
| 6,497,447 B1 | 12/2002 | Willard | |
| 2001/0008345 A1 | 7/2001 | Stolle et al. | |
| 2001/0033090 A1 | 10/2001 | MacFarland | |
| 2004/0155482 A1 | 8/2004 | Netzel et al. | |
| 2005/0184554 A1 * | 8/2005 | Queveau et al. | 296/108 |
| 2005/0242614 A1 * | 11/2005 | MacNee et al. | 296/107.09 |
| 2005/0242616 A1 * | 11/2005 | MacNee et al. | 296/117 |
| 2005/0242617 A1 * | 11/2005 | Guillez et al. | 296/121 |
| 2005/0258664 A1 * | 11/2005 | Willard | 296/107.09 |

* cited by examiner

*Primary Examiner*—H Gutman
(74) *Attorney, Agent, or Firm*—Harness, Dickey & Pierce, P.L.C.

(57) ABSTRACT

In accordance with the present invention, a convertible roof system is provided which includes rotary actuators which are operable to pivot the roof rails relative to one another and a portion of the actuator is disposed within one of the roof rails. In another aspect of the present invention, a convertible roof for an automotive vehicle is provided which includes a retractable roof cover with a flexible portion and at least three rotary actuators that are each located at a pivot joint between the roof rails and are operable to rotate the roof rails relative to one another or to the vehicle.

29 Claims, 8 Drawing Sheets

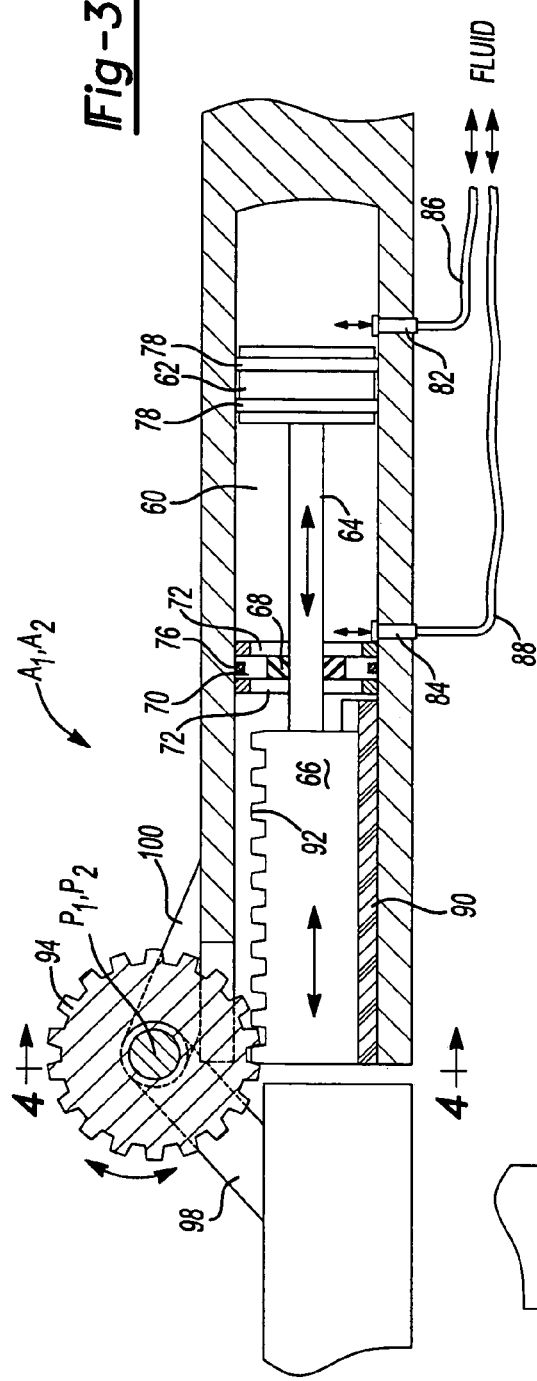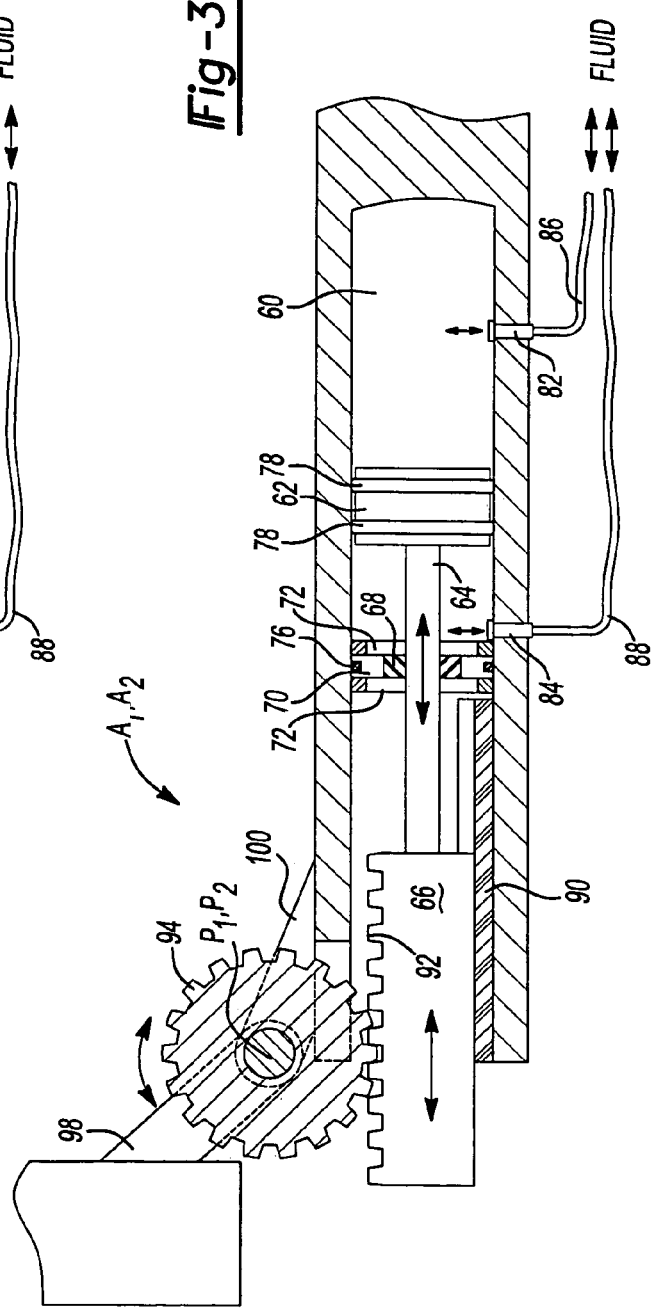

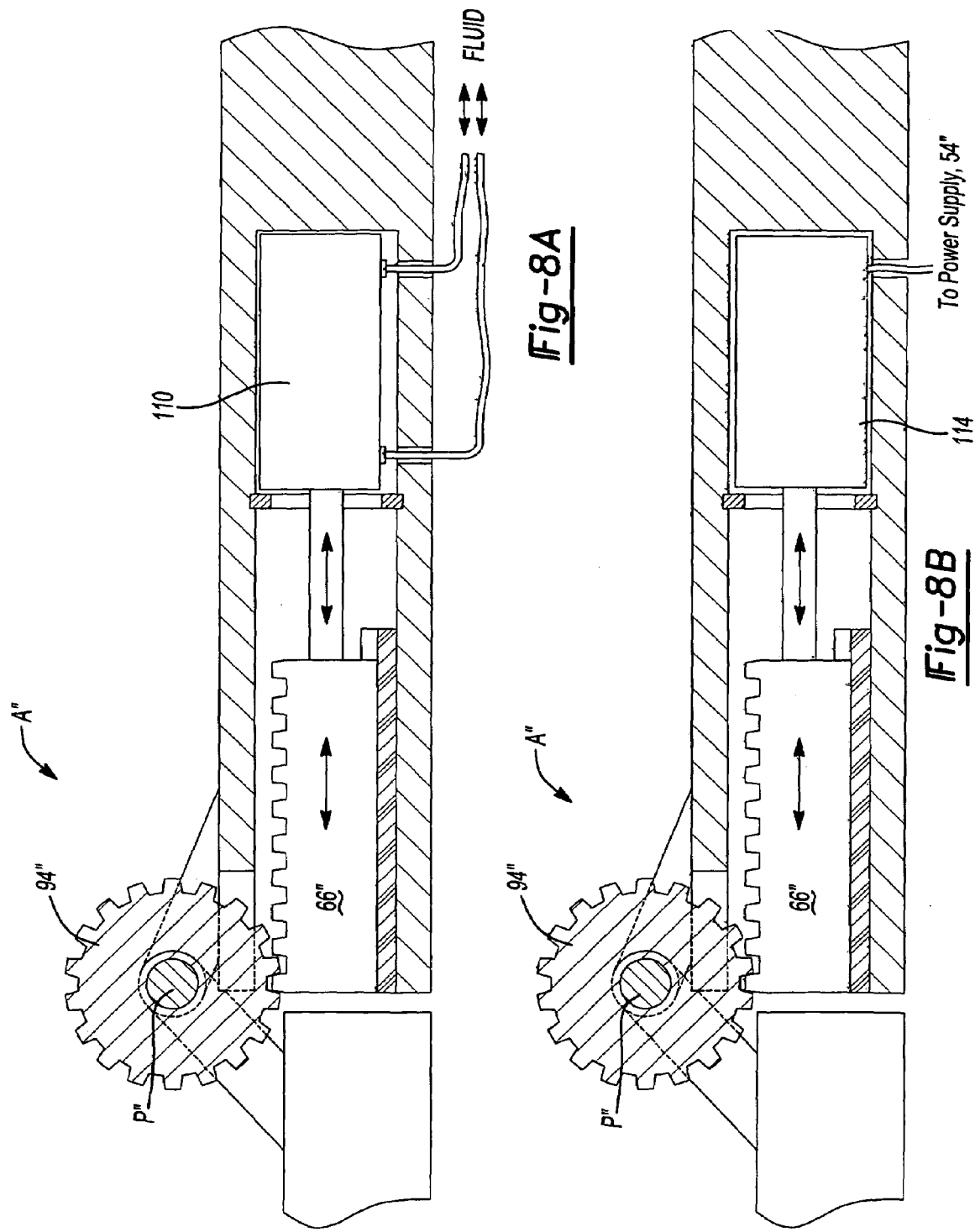

CONVERTIBLE ROOF SYSTEM

BACKGROUND AND SUMMARY OF THE INVENTION

This invention generally relates to convertible roofs for automotive vehicles and, more particularly, to a convertible roof system that uses rotary actuators to control the movement of the retraction mechanism.

Traditional soft-top convertible roofs for automotive vehicles typically employ three, four or five roof bows, having an inverted U-shape spanning transversely across the vehicle for supporting a vinyl, canvass or polyester fabric pliable roof cover. A number one roof bow is mounted to a pair of front roof rails and is typically latched to a stationary front header panel of the automotive vehicle body disposed above the front windshield. A number two roof bow is typically mounted to either the front roof rails or to the center roof rails which are pivotally coupled to the front roof rails. The number three roof bow is typically mounted to either the center roof rails or to the rear roof rails which are pivotally coupled to the center roof rails. Any remaining roof bows are commonly mounted to the rear roof rails. The roof cover can also have a hard or rigid portion along with the pliable portion. For example, reference should be made to U.S. Pat. No. 5,429,409 entitled "Convertible Top," which is incorporated by reference herein.

The movement of the roof rails and the roof bows is typically controlled by linkage assemblies, such as two pairs of four-bar linkage assemblies on each side of the vehicle. When moving the convertible roof between the raised and stowed positions, the motion of the roof rails and roof bows and roof cover are carefully coordinated to avoid interfering with one another. To obtain the desired motions and the timing for the motions, the linkage assemblies may include complex linkage shapes or arrangements. These complex arrangements can add to the cost of producing the convertible roof. Additionally, these complex linkages may increase the packaging space required to stow the convertible roof in the retracted position. The increased packaging space diminishes the space in the vehicle available for other purposes such as storing goods and/or the size of the passenger compartment. Thus, it would be advantageous to provide a convertible roof that uses a minimal packaging space. Furthermore, it would be advantageous if such convertible roof were economical to produce.

In addition to the packaging space, these complex linkages may require a significant amount of torque to be generated at the interface of the convertible roof with the vehicle body to retract and extend the convertible roof. The large torque is typically required due to the second four-bar linkage that is used to drive the front portion of the convertible roof. This second four-bar linkage is typically driven from the first four-bar linkage that is associated with the vehicle body. The requirement for a large torque at the interface of the convertible roof to the vehicle body increases the cost of the actuators used to operate the convertible roof. Thus, it would be advantageous to produce a convertible roof having a lower torque requirement at the interface between the convertible roof and the vehicle body.

The linkage assemblies used to control and coordinate the motion of the various components of the convertible roof are typically formed by casting or stamping. When these linkages are cast or stamped, the holes therein that are used to provide pivotal connections between the linkages and other components of the convertible roof. The holes, however, have limited tolerances. As a result of the limited tolerances, the linkages may have some play or slop in them that is undesirable. Thus, it would be advantageous to provide a convertible roof system wherein the control of the various components of the convertible roof is more precise.

In accordance with the present invention, a convertible roof system is provided which includes rotary actuators which are operable to pivot the roof rails relative to one another and a portion of the actuator is disposed within one of the roof rails. In another aspect of the present invention, a convertible roof for an automotive vehicle is provided which includes a retractable roof cover with a flexible portion and at least three rotary actuators that are each located at a pivot joint between the roof rails and are operable to rotate the roof rails relative to one another or to the vehicle. In still another aspect of the present invention, a roof rail for a convertible roof is provided that has a fluid chamber within the roof rail and a fluid driven piston that is disposed within the fluid chamber. The present invention also provides for a method of manufacturing a convertible roof with an integral rotary actuator.

The use of the rotary actuators reduces the need for complex linkage assemblies to control and coordinate the motion of the various roof rails and components of the convertible roof. Additionally, by locating at least a portion of the rotary actuators within the roof rails, the actuators take up less space and reduce the packaging space required for stowing the convertible roof. Additional objects, advantages and features of the present invention will become apparent from the following description and the pending claims, taken in conjunction with the accompanying drawings. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 3A and 3B are fragmented views, shown partially in section, of a first preferred embodiment of a rotary actuator of the convertible roof system according to the principles of the present invention with two roof rails in a fully raised and partially retracted position, respectively;

FIGS. 8A and 8B are fragmented views, shown partially in section, of a second preferred embodiment of a rotary actuator according to the principles of the present invention utilizing a prepackaged fluidic cylinder and solenoid, respectively, within one of the roof rails.

DETAILED DESCRIPTION OF THE PREFERRED EMBODIMENTS

The following description of the preferred embodiments are merely exemplary in nature and is in no way intended to limit the invention, its application, or uses.

Figure 1:
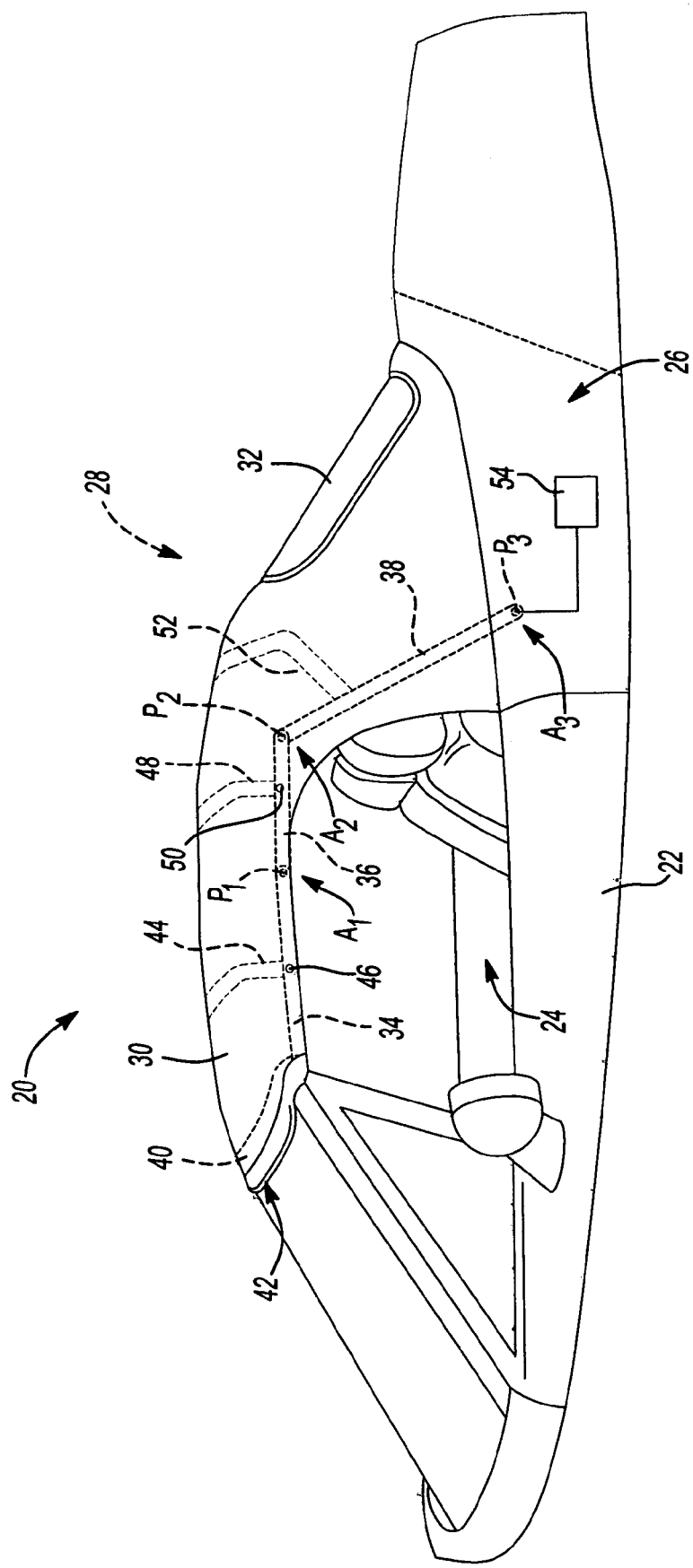
FIG. 1 is a side elevation view of an automotive vehicle incorporating a first preferred embodiment of a convertible roof system of the present invention.
Figure 2A:
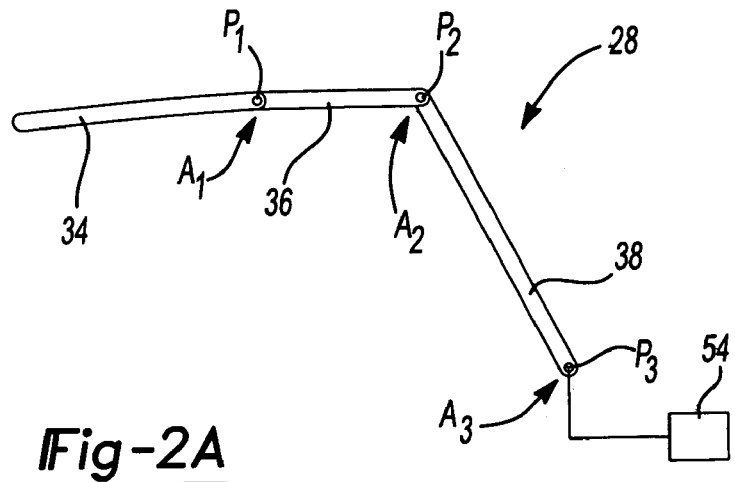
FIGS. 2A–2C are schematic representations of the first convertible roof system of the present invention in a fully raised, partially retracted and fully retracted position, respectively.

FIG. 1 shows a first preferred embodiment of a convertible roof system 20 of the present invention. Convertible roof system 20 is employed on an automotive vehicle 22. Vehicle 22 has a passenger compartment 24 and a generally U-shaped boot well or stowage compartment 26 aft of the passenger compartment 24. Stowage compartment 26 can be a part of the general storage area or trunk of vehicle 22 or can be a separate area separated from the trunk area. Convertible roof system 20 is of the type utilizing a top stack or retraction mechanism 28 that partially supports a roof cover 30 and is operable between a fully raised position, as shown in FIGS. 1 and 2A, through intermediate positions such as that shown in FIG. 2B, to a fully stowed or retracted position, as shown in FIG. 2C. Roof cover 30 is a soft roof cover and is made from a pliable or flexible material, such as vinyl, canvas or a polyester fiber. If desired, roof cover 30 can also include a hard or rigid portion (not shown) and the hard portion can also be covered by the same material that comprises the soft portion of the roof cover to give a uniform appearance. Roof cover 30 includes a window or backlite 32. Backlite 32 is attached to roof cover 30 and is not pivotally coupled to retraction mechanism 28. For example, reference should be made to U.S. Pat. No. 5,887,936 titled "Backlite System for Use in an Automotive Vehicle Convertible Roof," by Cowsert, and U.S. Pat. No. 6,102,467 titled "Backlight Retention System for Use in an Automotive Vehicle Convertible Roof," by Laurain et al., both of which are herein incorporated by reference. Backlite 32 can be made of either a rigid material, such as glass or polycarbonate, as shown, or a pliable transparent vinyl material (not shown).

Convertible roof system 20 is generally symmetrical about a longitudinal, fore-and-aft center line (not shown) of vehicle 22. Retraction mechanism 28 includes right and left roof rails and rotary actuators on the respective right and left sides of vehicle 22. For brevity, only the left side of retraction mechanism 28 is shown and discussed, however, it should be understood that right side roof rails and rotary actuators are also provided as part of retraction mechanism 28 and are mirrored images of the left side. Also, when using the terms "fore" and "aft" and "front" and "back" in describing components of retraction mechanism 28, such reference refers to the orientation of the components when retraction mechanism 28 is in the fully raised position.

Retraction mechanism 28 includes a front roof rail 34 that is pivotally connected to a center roof rail 36 at pivot joint $P_1$. Center roof rail 36 is pivotally coupled to a rear roof rail 38 at pivot joint $P_2$. Rear roof rail 38 is pivotally connected to vehicle 22 at pivot $P_3$. At each pivot joint $P_1$, $P_2$, $P_3$ there are respective rotary actuators $A_1$, $A_2$ and $A_3$. First actuator $A_1$ is operable to cause front roof rail 34 to rotate relative to center roof rail 36 about pivot joint $P_1$. Similarly, second actuator $A_2$ is operable to cause center roof rail 36 to rotate relative to rear roof rail 38 about pivot joint $P_2$. Third actuator $A_3$ is operable to cause rear roof rail 38 to pivot relative to vehicle 22 about pivot joint $P_3$. The details of actuators $A_1$, $A_2$, $A_3$ are described in more detail below.

Retraction mechanism 28 also includes a first roof bow 40 that extends transversely across vehicle 22 and has a front edge 42 that is latched to a stationary front header panel of vehicle 22 disposed above the front windshield when in the fully raised position, as shown in FIG. 1. Roof cover 30 is fixedly attached to first roof bow 40. First roof bow 40 is fixedly connected to front roof rail 34. Alternatively, first roof bow 40 can be formed integrally with front roof rail 34. For example, first roof bow 40 and front roof rail 34 can be integrally cast from aluminum or a magnesium alloy or formed of a polymeric material, such as glass filled nylon. Also alternatively, first roof bow 40 could be pivotally coupled to front roof rail 34. A second roof bow 44 extends transversely across vehicle 22 and is pivotally connected to a rear portion of front roof rail 34 at pivot 46. Second roof bow 44 is coupled to roof cover 30 so that movement of roof cover 30 causes second roof bow 44 to rotate about pivot 46. A third roof bow 48 extends transversely across vehicle 22. Third roof bow 48 is pivotally connected to a rear portion of center roof rail 36 at pivot 50. Third roof bow 48 is also coupled to roof cover 30 so that movement of roof cover 30 causes third roof bow 48 to rotate about pivot 50. A fourth roof bow 52 extends transversely across vehicle 22 and is fixedly attached to rear roof rail 38. Fourth roof bow 52 is coupled to roof cover 30. Movement of fourth roof bow, however, is not determined by movement of roof cover 30 due to the fixed connection between fourth roof bow 52 and rear roof rail 38.

There is a power supply 54 that is operable to provide a driving force to actuators $A_1$, $A_2$ and $A_3$. Power supply 54 can take a variety of forms depending upon the mode of force used to drive actuators $A_1$, $A_2$, $A_3$. For example, when actuators $A_1$, $A_2$, $A_3$ are hydraulic actuators, power supply 54 is operable to supply hydraulic fluid to and from the various actuators. If actuators $A_1$, $A_2$, $A_3$ were electrically driven, then power supply 54 would be operable to supply electrical power to drive the actuators.

Figure 2B:
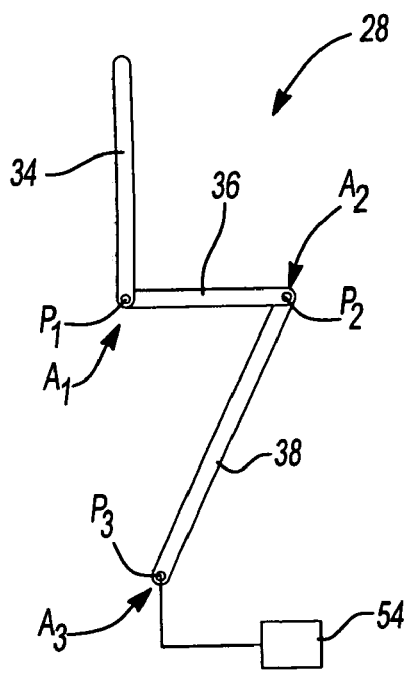
Figure 2C:
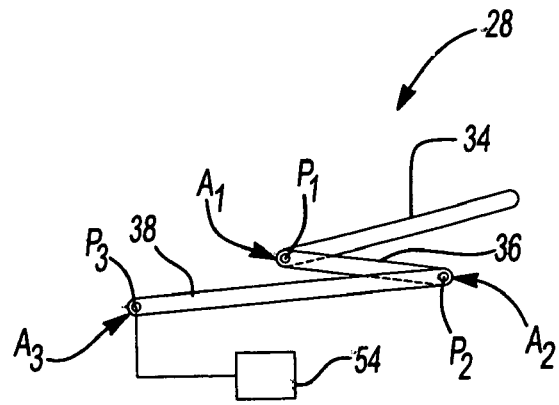

Referring now to FIGS. 2A–2C, retraction mechanism 28 in conjunction with actuators $A_1$, $A_2$ and $A_3$ is operable to move between a raised position, as shown in FIG. 2A, through intermediate positions such as that shown in FIG. 2B, to a retracted or stowed position, as shown in FIG. 2C. During retraction, actuator $A_1$ causes front roof rail 34 to rotate upwardly and rearwardly relative to center roof rail 36 about pivot $P_1$. Second actuator $A_2$ causes center roof rail 36 to rotate forwardly and downwardly relative to rear roof rail 38 about pivot $P_2$. Third actuator $A_3$ causes rear roof rail 38 to rotate rearwardly and downwardly about pivot $P_3$.

FIGS. 3A and 3B show the details of rotary actuators $A_1$ and $A_2$ used with the convertible roof system of the present invention. In the first preferred embodiment, a portion of one of the roof rails of each pivot joint $P_1$, $P_2$ serves as a fluid chamber 60 for each actuator $A_1$, $A_2$. A moveable piston 62 is disposed within fluid chamber 60 and a connecting rod 64 extends from piston 62 to a moveable rack 66. Connecting rod 64 extends through a seal 68 that is contained in an end cap 70 that defines one end of fluid chamber 60. End cap 70 is retained within the roof rail with a pair of snap rings 72 that reside within a pair of annular grooves in the wall of fluid chamber 60. An O-ring 76 extends around end cap 70 to provide a fluid-tight seal between end cap 70 and the wall of fluid chamber 60. Furthermore, a pair of O-rings 78 reside within annular grooves along the periphery of piston 62 in order to provide a fluid-tight seal to separate the fluid on either side of piston 62. First and second fluid ports 82, 84 are positioned on opposite ends of fluid chamber 60 and are in fluid communication with fluid chamber 60. Ports 82, 84 allow for the attachment of fittings which connect to respective first and second fluid lines 86, 88. Fluid lines 86, 88 are connected to power supply 54 to provide fluid to and return fluid from fluid chamber 60. The coordinated supply and withdrawal of fluid from fluid chamber 60 on opposite sides of piston 62 causes piston 62 to move within fluid chamber 60.

Rack 66 moves back and forth with the movement of piston 62 via connecting rod 64. A guide member 90 is positioned within the roof rail and is configured to facilitate and guide movement of rack 66 relative to the roof rail. Guide member 90 can be formed from a variety of materials. For example, guide member 90 can be formed from polytetrafluoroethylene and shaped into a desired configuration that is complementary to rack 66, metal, or a polymeric material. Rack 66 has a plurality of teeth 92 that are engaged with teeth on a pinion 94. Pinion 94 is rotatably attached to the roof rail that contains rack 66. The engagement of pinion 94 with teeth 92 of rack 66 causes pinion 94 to rotate about pivot P with movement of rack 66 into and out of the roof rail. Thus, an actuator according to the preferred embodiment of the present invention utilizes a fluidic chamber within the roof rail and a piston therein to linearly drive a rack which is engaged with and rotates a pinion.

Pinion 94 is fixedly attached to the other adjacent roof rail. Specifically, in actuator $A_1$, rack 66 moves in and out of center roof rail 36 and pinion 94 is fixedly attached to front roof rail 34. In second actuator $A_2$, rack 66 moves in and out of rear roof rail 38 while pinion 94 is fixedly attached to center roof rail 36. Alternatively, first and second actuators $A_1, A_2$ can be reversed with rack 66 moving in and out of the roof rail which was fixedly attached to pinion 94 and pinion 94 being fixedly attached to the roof rail within which rack 66 used to move in and out of. In yet another alternative, center roof rail 36 could have a fluid chamber 60 with a piston 62 on each end and attached to a rack 66 while pinions 94 are fixedly attached to front end rear roof rails 34 and 38 and engaged with the racks 66. In still another alternate embodiment, pinion 94 can be a sector gear with an integral arm or link that is attached to the roof rail.

Figure 4:
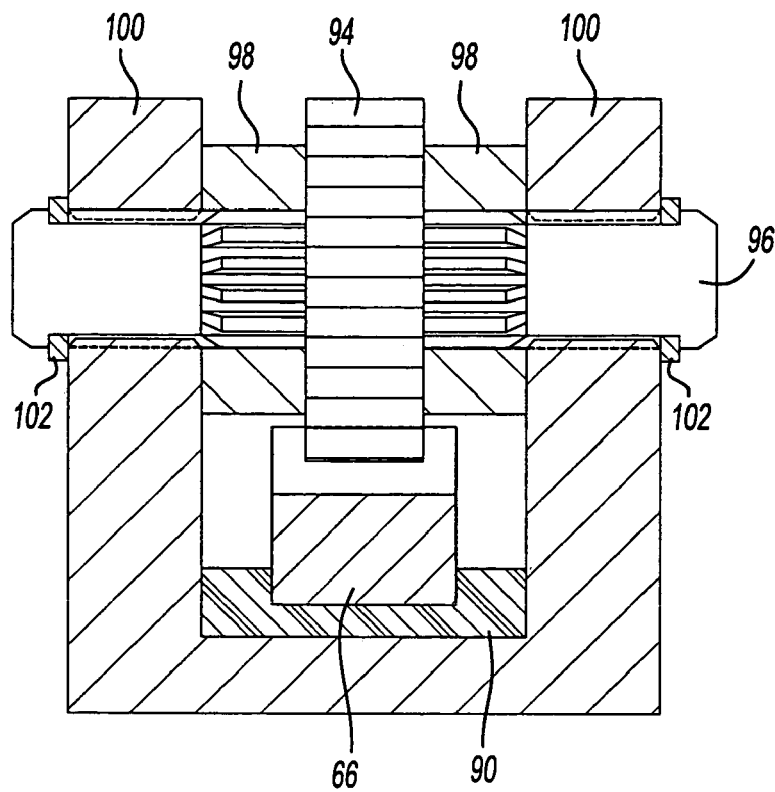
FIG. 4 is a cross-sectional view, taken along line 4—4 of FIG. 3A, showing the first preferred embodiment of the rotary actuator.

Referring now to FIG. 4, a cross-sectional view of the actuator of FIG. 3A along line 4—4 is shown. As can be seen in FIG. 4, pinion 94 is fixedly attached to a shaft 96, such as by a spline connection. Arms or extensions 98 of the roof rail that does not contain the rack extend around shaft 96 on opposite sides of pinion 94. Arms 98 are fixedly secured to shaft 96 with a spline connection. Arms or extensions 100 of the roof rail containing rack 66 encircle shaft 96 on opposite sides of pinion 94 with arms 98 disposed therebetween. Arms 100, however, are not fixedly secured to shaft 96 and shaft 96 is free to rotate within arms 100. Snap rings 102 secure opposite ends of shaft 96 to prevent shaft 96 from being removed from pinion 94 and arms 98, 100.

Figure 7:
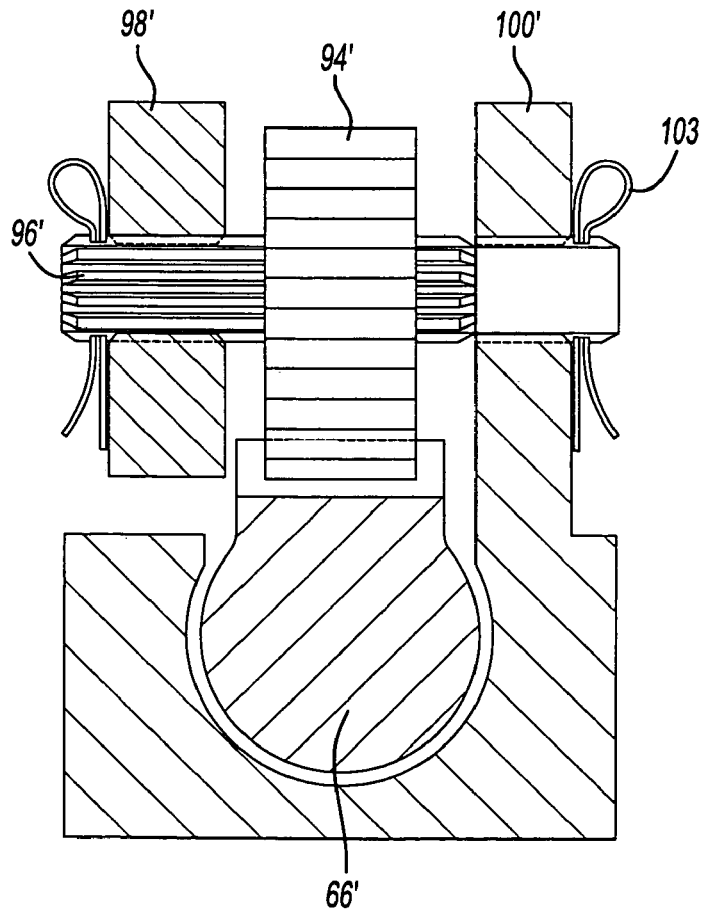
FIG. 7 is a cross-sectional view, similar to that of FIG. 4, showing an alternate embodiment of the rotary actuator.
Figure 5:
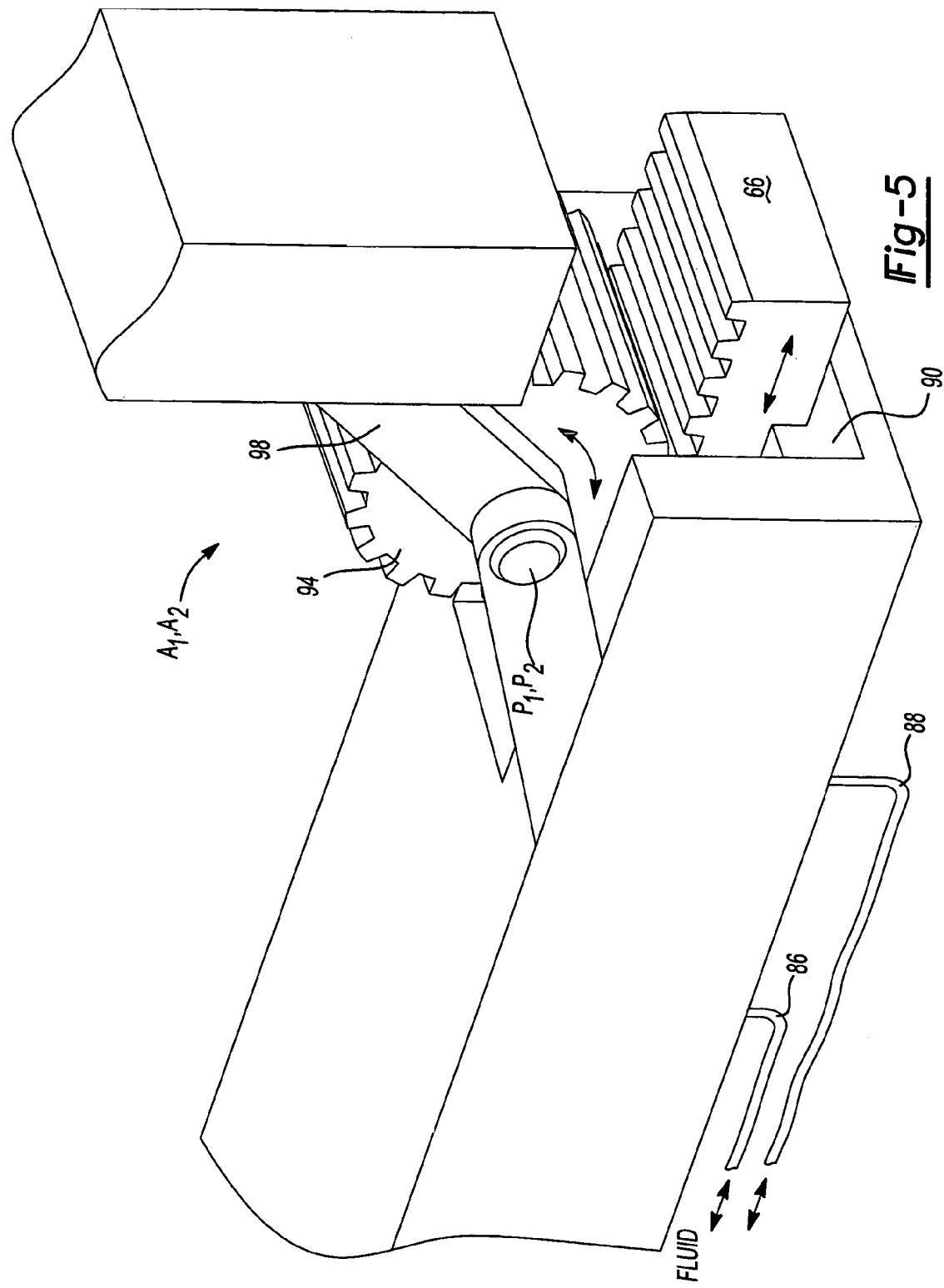
FIG. 5 is a partially fragmented and perspective view of the rotary actuator of FIG. 3B with the roof rails in a partially retracted position.

In an alternate embodiment, as shown in FIG. 7, the components of the actuator and the connection of the actuator with pinion 94' are altered. In this embodiment, the use of a guide member to guide movement of rack 66' relative to the roof rail is avoided. The roof rail and rack are configured to be complementary to one another so that the use of a guide member is not required. Furthermore, each roof rail has only a single arm 98', 100' that encircles shaft 96'. Again, arm 98' has a spline connection with shaft 96' while arm 100' allows shaft 96' to rotate freely therein. Cotter pins 103 secure the ends of shaft 96'.

Figure 6:
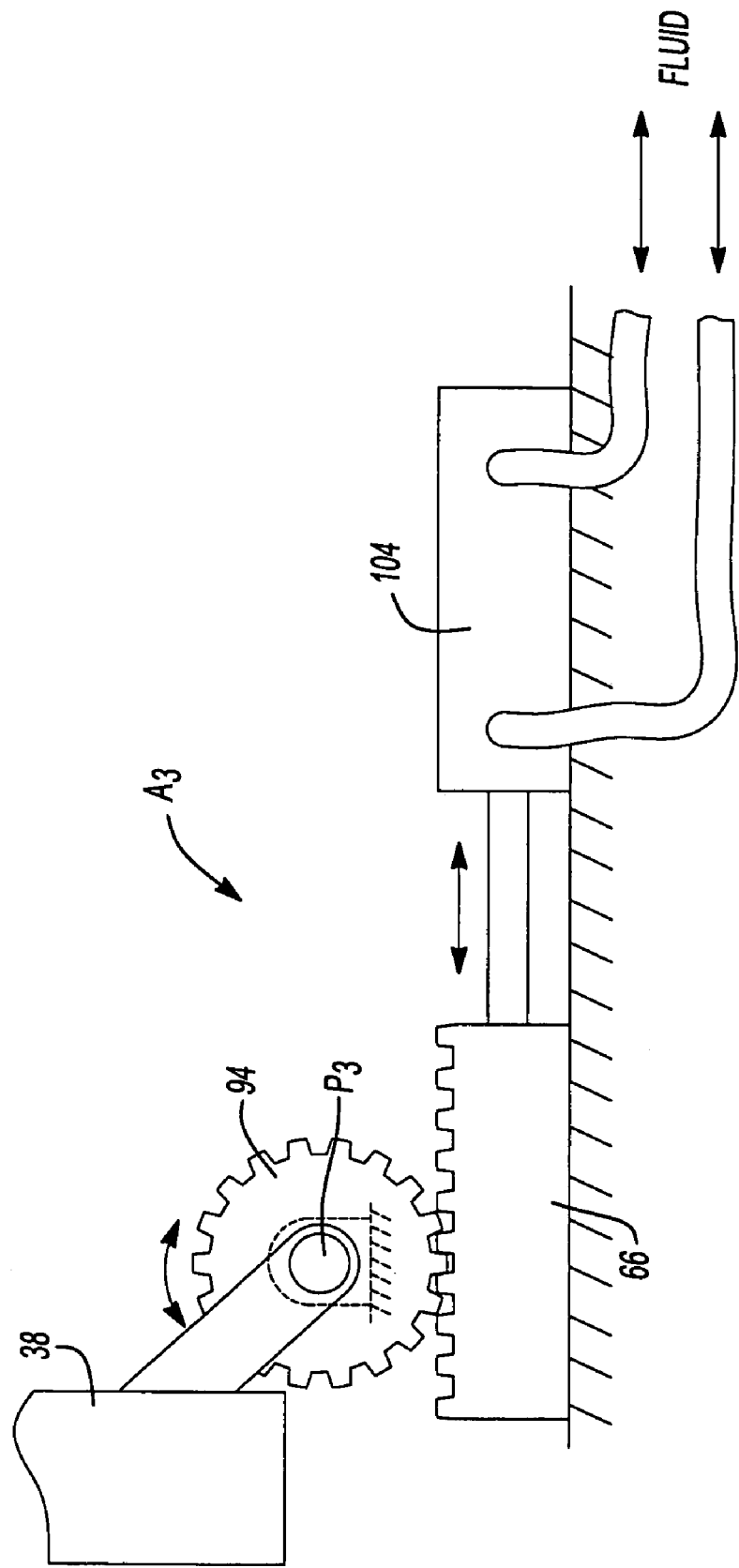
FIG. 6 is a partially fragmented side elevation view of a first preferred embodiment of a rotary actuator of the convertible roof system of the present invention for use between a rearmost roof rail and the body of the vehicle.

Referring now to FIG. 6, third actuator $A_3$ causes rear roof rail 38 to rotate relative to vehicle 22 about pivot $P_3$. In third actuator $A_3$, the moveable rack 66 is not disposed within a roof rail. Rather, because third actuator $A_3$ is associated with pivot joint $P_3$ between rear roof rail 38 and vehicle 22, it is preferred that a moveable rack 66 be attached to a fluidic cylinder or other linearly actuating device which is coupled to vehicle 22. As shown, moveable rack 66 is coupled to a fluidic cylinder 104 which is attached to a bracket or body of vehicle 22 within stowage compartment 26. Cylinder 104 is also coupled to power supply 54 to supply and remove the appropriate fluid to/from fluidic cylinder 104. Movement of fluidic cylinder 104 causes moveable rack 66 to move back and forth. Pinion 94 is fixedly attached to arms of rear roof rail 38 so that pinion 94 and rear roof rail 38 are stationary relative to one another. Rear roof rail 38 and pinion 94 are pivotally connected to vehicle 22 at pivot $P_3$ and pinion 94 is engaged with teeth 92 of rack 66. With this arrangement, movement of rack 96 causes third roof rail 38 to pivot about pivot $P_3$ with the rotation of pinion 94. Thus, third actuator $A_3$ converts translational movement of moveable rack 66 into rotational movement of rear roof rail 38 about pivot $P_3$. Alternatively, actuator $A_3$ can be formed similar to actuators $A_1, A_2$ wherein a portion of rear roof rail 38 has a fluid chamber 60 with a moveable piston 62 therein. The piston 62 would be coupled to moveable rack 66 to cause a moveable rack to move in and out of rear roof rail. 38. Pinion 94 would be fixed to vehicle 22 and engage with teeth 92 in moveable rack 66. Rear roof rail 38 would be pivotally coupled to vehicle 22 at pivot $P_3$ so that as moveable rack 66 moved in and out of rear roof rail 38, rear roof rail 38 would pivot relative to vehicle 22 about pivot $P_3$.

Actuators $A_1, A_2, A_3$ can be driven by a variety of power sources. For example, the actuators are preferably hydraulicly driven and power supply 54 operable to supply and remove hydraulic fluid to/from the individual actuators independently of one another. Alternatively, the actuators can be pneumatic actuators and power supply 54 operable to supply and remove air.

To make the actuators, the roof rails are created and a fluid chamber 60 is manufactured therein. For example, the roof rails can be cast or extruded into a desired configuration preferably from aluminum and alternately from steel, magnesium and polymeric materials. Once the roof rail is cast or extruded, fluid chamber 60 is created therein by boring or machining fluid chamber 60. This operation provides a nice smooth internal wall for fluid chamber 60 that allows piston 62 to be sealed therein. Additionally, ports 82, 84 are also machined therein. Furthermore, annular grooves within the chamber wall within which snap rings 72 can be inserted are also machined into the roof rail. With the fluid chamber created, piston 94 and shaft 96 are then inserted into fluid chamber 60. The innermost snap ring is subsequently positioned into its annular groove and end cap 70 positioned on connecting rod 64 with connecting rod 64 passing through seal 68. With end cap 70 in the desired position, outer snap ring 72 then secures end cap 70 in place. Guide member 90, if so equipped, is positioned and secured within the roof rail. Rack 66 is attached to connecting rod 64 so that rack 66 moves in response to movement of piston 62. Fittings are attached to fluid ports 82, 84.

Once each roof rail having a fluid chamber 60 therein are created, the roof rails are aligned relative to one another with their arms 98, 100 and pinions 94 all in alignment. Shafts 96 are then inserted through the arms and pinions and retained with snap rings 102. During alignment, racks 66 are positioned in appropriate relation to the pinion 94 so that rack 66 and pinion 94 are synchronized to provide the desired motion for retraction mechanism 28. Retraction mechanism 28 is attached to vehicle 22 with rearmost roof rail 38 and its fixed pinion 94 pivotally attached to vehicle 22 with pinion 94 synchronized with the position of rack 66 which is located on the body of vehicle 22. With retraction mechanism 28 now attached to vehicle 22, power supply 54 is connected to each of the actuators by the appropriate fluid lines. Thereafter, the fluid being used to drive the actuators is supplied to fluid chamber 60 on both sides of piston 62. Bleed valves (not shown) located in each fluid chamber 60 on opposite sides of piston 62 are provided to remove air pockets when using a non-pneumatic system. The roof bows and roof cover are also attached to the appropriate roof rails either prior to or after installation onto vehicle 22.

In operation, convertible roof system 20 is moved from the raised position, depicted in FIGS. 1 and 2A, through intermediate positions such as the one depicted in FIG. 2B to the stowed position depicted in FIG. 2C by first unlatching first roof bow 40 from the front header of vehicle 22. An operator engages a switch (not shown) located in passenger compartment 24. The switch is connected electrically to an electronic control unit (not shown) such as a microprocessor, that controls operation of power supply 54 and the operation of convertible roof system 20. The electronic control unit sends a signal to power supply 54 to cause power supply 54 to operate actuators $A_1$, $A_2$, $A_3$ to cause convertible roof system 20 to move from the raised position to the retracted position. Devices such as limit switches, sensors and/or potentiometers may be coupled to vehicle 22 and to the components of convertible roof system 20 to control and coordinate the movement of the various components. An example of a suitable control system for convertible roof system 20 is that disclosed in U.S. Pat. No. 6,288,511 entitled "Automotive Convertible Top System" issued to Porter et al. and assigned to the assignee of the present invention, the disclosure of which is incorporated by reference herein.

Power supply 54 causes first actuator $A_1$ to rotate front roof rail 34 rearwardly relative to center roof rail 36 about pivot $P_1$. In coordination with the movement of actuator $A_1$, power supply 54 also causes second actuator $A_2$ to cause center roof rail 36 to rotate forwardly relative to rear roof rail 38 about pivot $P_2$. Power supply 54 also causes third actuator $A_3$ to rotate rear roof rail 38 rearwardly about pivot $P_3$ to move retraction mechanism 28 into stowage compartment 26 of vehicle 22. The movements of roof rails 34, 36, 38 relative to one another via actuators $A_1$, $A_2$, $A_3$ are coordinated so that a smooth transition from a fully raised position to the fully stowed position is achieved.

To move retraction mechanism 28 from the stowed position to the raised position, power supply 54 is operated to cause actuators $A_1$, $A_2$ and $A_3$ to operate in a reverse fashion. Rear roof rail 38 rotates forwardly about pivot $P_3$ while center roof rail 36 rotates rearwardly relative to rear roof rail 38 about pivot $P_2$. Also, front roof rail 34' rotates forwardly relative to center roof rail 36 about pivot $P_1$. The expanding retraction mechanism 28 causes the cover 30 to become more taut and position pivotable roof bows 44, 48 into position. With retraction mechanism 28 in the fully raised position, first roof bow 40 can be securely latched to the front header of vehicle 22.

In a second preferred embodiment, as shown in FIGS. 8A and 8B, actuators A" use readily available prepackaged actuators to drive rack 66". The actuators A" can be located within one of the roof rails in place of the fluid chamber and piston (as shown) or attached to a bracket or body of vehicle 22 in stowage compartment 26, similar to that shown in FIG. 6. Rack 66" is engaged with a pinion 94" to cause pivotal movement about the associated pivot P". As shown in FIG. 8A, the preferred prepackaged actuator is a fluidic cylinder 110 that is positioned within the roof rail. Fluidic cylinder 110 is connected to a power supply to supply and remove the appropriate fluid to/from fluidic cylinder 110. In an alternate of the second preferred embodiment, the readily available prepackaged actuator is in the form of an electromagnetic solenoid 114, as shown in FIG. 8B. Solenoid 114 is positioned in one of the roof rails in place of the fluid chamber and piston, and attached to rack 66" which is engaged with pinion 94". Solenoid 114 is supplied electrical power from power supply 54" to control the movement of rack 66" and, thus, the movement of the retraction mechanism. Alternatively, a linearly extendable and retractable electric motor may be used in place of solenoid 114. Thus, in the second preferred embodiment, actuators A" are each driven by readily available prepackaged actuators that are operable to cause the retraction mechanism to move between the raised and stowed positions in a fashion similar to that discussed above with reference to retraction mechanism 28.

Figure 8C:
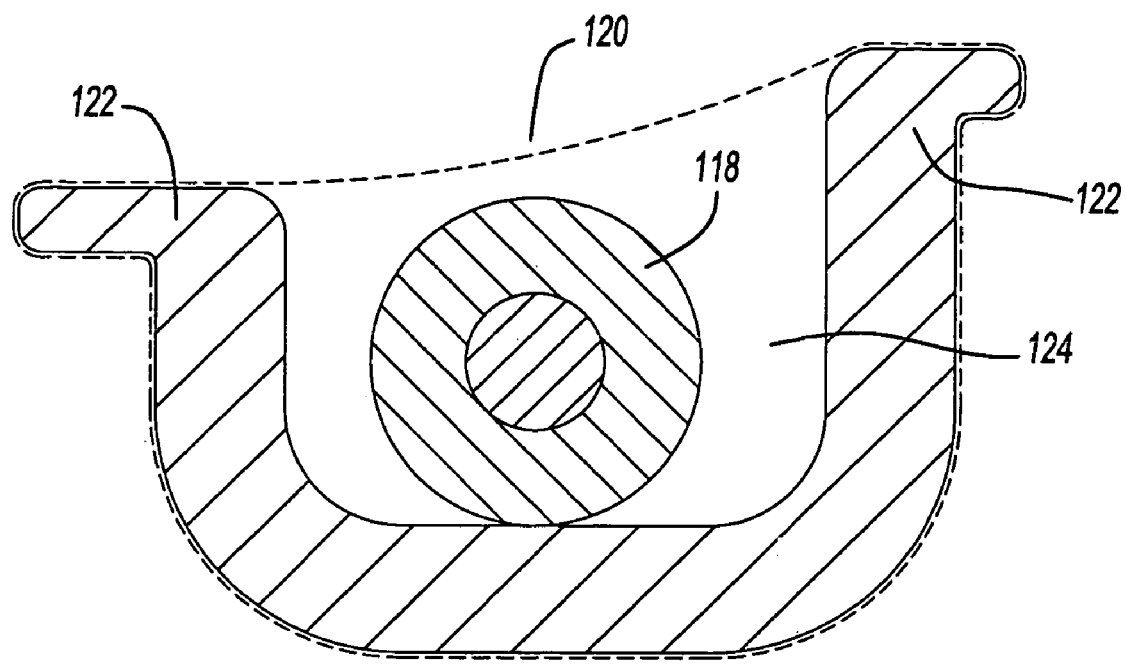
FIG. 8C is a cross-sectional view through an actuator of the second preferred embodiment within an envelope of a roof rail.

Referring now to FIG. 8C, a cross-sectional view of a roof rail having a prepackaged actuator 118 located within an envelope 120 of the roof rail is shown. Envelope 120 is generally defined as the cross-sectional periphery of the roof rail while extending across any voids or channels therein between adjacent sections of the roof rail. For example, as shown in FIG. 8C, envelope 120 substantially follows the periphery of the roof rail but extends between the upper portions 122 of the roof rail that define an internal channel 124 therebetween. The locating of actuator 118 within envelope 120 provides for a reduced packaging space of a top stack mechanism using such an arrangement. That is, because actuator 118 is within envelope 120, actuator 118 does not require any additional stowage space when the retraction mechanism is in the stowed position. Thus, in this alternate of the second preferred embodiment, a readily available prepackaged actuator is secured to the roof rail within the envelope 120 of the roof rail.

Thus, a convertible roof system 20 according to the principles of the present invention utilizes rotary actuators $A_1$, $A_2$ and $A_3$ at the various pivot joints $P_1$, $P_2$ and $P_3$ between the roof rails of retraction mechanism 28 and vehicle 22. The use of rotary actuators allows for precise control over the movement of the various components of retraction mechanism 28. The positioning of portions of each of actuators $A_1$, $A_2$ and $A_3$ within or integral to the roof rails or within an envelope of the roof rails of the retraction mechanism provides for a reduced packaging space. Furthermore, by utilizing these rotary actuators, complex linkage assemblies used to coordinate the movement of the various roof rails is avoided. Moreover, the torque required to drive the retraction mechanism at pivot $P_3$ may be reduced by not requiring the torque to also control the rotation of the front roof rail 34 relative to center roof rail 36.

While various aspects of convertible roof system 20 and retraction mechanism 28 have been disclosed, it should be appreciated that many other variations may be employed without departing from the scope of the present invention. For example, actuators $A_1$, $A_2$ and $A_3$ can be reversed in their orientation relative to the roof rails and vehicle 22 and/or one roof rail can have fluid chamber 60 at both ends thereof, if desired. Furthermore, the specific configurations or orientations of the roof rails and actuators can have shapes that differ from those shown and still be within the scope of the present invention. Thus, the preceding discussion discloses and describes merely an exemplary embodiment of the present invention. One skilled in the art will readily recognize from such discussion, and from the accompanying drawings and claims, that various changes, modifications and variations can be made therein without departing from the spirit and scope of the present invention as defined in the following claims.

What is claimed is:

1. A convertible roof system comprising:
    (a) a retractable roof cover; and
    (b) a retraction mechanism operable to move said roof cover between raised and stowed positions, said retraction mechanism including:
        (i) at least two roof rails pivotally connected together; and
        (ii) a rotary actuator operable to pivot a first of said roof rails relative to a second of said roof rails, a portion of said actuator being disposed within said first roof rail.

2. The convertible roof system of claim 1, wherein said rotary actuator includes a fixed pinion on said second roof rail and a moveable rack engaged with said pinion, movement of said rack causing said roof rails to pivot relative to one another.

3. The convertible roof system of claim 2, wherein said rack is at least partially disposed within said first roof rail.

4. The convertible roof system of claim 3, wherein said rotary actuator includes a fluid driven piston disposed within said first roof rail, movement of said piston causing movement of said rack.

5. The convertible roof system of claim 4, wherein said first roof rail has an internal fluidic chamber within which said piston moves and said piston is sealingly engaged with walls of said chamber.

6. The convertible roof system of claim 1, wherein a rearmost one of said roof rails is pivotally connected to a vehicle and further comprising a rear rotary actuator operable to pivot said rearmost roof rail relative to said vehicle.

7. The convertible roof system of claim 6, wherein a portion of said rear rotary actuator is disposed within said rearmost roof rail.

8. The convertible roof system of claim 1, wherein said rotary actuator is a first rotary actuator and said retraction mechanism further includes:
    a third roof rail pivotally connected to one of said first and second roof rails; and
    a second rotary actuator operable to pivot said third roof rail relative to one of said first and second roof rails, a portion of said second actuator being disposed within said third roof rail.

9. The convertible roof system of claim 1, wherein said retraction mechanism further includes a transversely extending roof bow pivotally connected to a forwardmost one of said roof rails, said roof bow being coupled to said roof cover, and movement of said roof bow relative said forwardmost roof rail being controlled by said roof cover.

10. The convertible roof system of claim 1, wherein said actuator is disposed within an envelope of said first roof rail.

11. The convertible roof system of claim 1, wherein said actuator is a fluidic actuator.

12. The convertible roof system of claim 1, wherein said actuator is an electromagnetic actuator.

13. A convertible roof for an automotive vehicle, the convertible roof comprising:
    a retractable roof cover, a portion of said roof cover being flexible; and
    a retraction mechanism operable to move said roof cover between raised and retracted positions, said retraction mechanism including:
        at least three roof rails;
        a first pivot joint pivotally connecting a first one of said roof rails to a fixed location relative to the vehicle;
        a second pivot joint pivotally connecting a second one of said roof rails to said first roof rail;
        a third pivot joint pivotally connecting a third one of said roof rails to said second roof rail; and
        at least three rotary actuators, one of said rotary actuators being located at each of said pivot joints and operable to rotate one said roof rail associated with each pivot joint relative to another said roof rail or to the vehicle.

14. The convertible roof of claim 13, wherein each of said rotary actuators include a pinion and a moveable rack engaged with said pinion, and movement of said rack causing rotation of one said roof rail associated with a respective one of said rotary actuators.

15. The convertible roof of claim 14, wherein each of said rotary actuators include a fluid driven piston coupled to and driving movement of said rack, at least two of said pistons being disposed within one said roof rail.

16. The convertible roof of claim 15, wherein each roof rail having a piston therein has a fluid chamber within which said piston resides and said piston sealingly engages with a wall of said fluid chamber.

17. The convertible roof of claim 14, wherein each pinion is fixed to one of said roof rails or said vehicle.

18. The convertible roof of claim 13, wherein a portion of at least two of said rotary actuators is disposed within one said roof rail.

19. A roof rail system for a convertible vehicle, said roof rail system comprising:
    an elongated roof rail;
    a fluid chamber within said roof rail; and
    a fluid driven piston disposed in said fluid chamber, said piston being operable to move within said fluid chamber in response to a fluid pressure imparted on said piston.

20. The roof rail system of claim 19, further comprising a moveable rack coupled to said piston.

21. The roof rail system of claim 20, further comprising:
    a rod coupling said piston to said rack; and
    a seal within said fluid chamber, said seal being disposed around said rod and preventing fluid within said fluid chamber from leaving said fluid chamber through said seal with movement of said rod.

22. The roof rail system of claim 21, further comprising:
    an end cap sealingly engaged with walls of said fluid chamber; and
    at least one retaining ring operable to retain said end cap in a fixed position,
    wherein said seal is disposed in said end cap.

23. The roof rail system of claim 20, further comprising a guide member positioned within said elongated member and wherein said rack moves along said guide member in response to movement of said piston.

24. The roof rail system of claim 19, further comprising a pair of fluid ports operable to supply and remove fluid from said fluid chamber on opposite sides of said piston.

25. A roof rail system for a convertible vehicle, the roof rail system comprising:
   a roof rail; and
   an actuator at least partially disposed within said roof rail, said actuator operable to move said roof rail relative to a vehicle or another roof rail.

26. The roof rail system of claim 25, wherein said actuator is a prepackaged actuator.

27. The roof rail system of claim 26, wherein said actuator is attached to said roof rail and is disposed within an envelope of said roof rail.

28. The roof rail system of claim 25, wherein said actuator is a fluidic actuator.

29. The roof rail system of claim 25, wherein said actuator is an electromagnetic actuator.

* * * * *

UNITED STATES PATENT AND TRADEMARK OFFICE
CERTIFICATE OF CORRECTION

| | | |
|---|---|---|
| PATENT NO. | : 7,100,964 B2 | Page 1 of 1 |
| APPLICATION NO. | : 10/924336 | |
| DATED | : September 5, 2006 | |
| INVENTOR(S) | : Arthur L. MacNee, III | |

It is certified that error appears in the above-identified patent and that said Letters Patent is hereby corrected as shown below:

Column 6, line 27, "rail. 38" should be --rail 38--.

Column 7, line 44, "P$_2$" should be --P$_2$.--.

Column 7, line 56, "34' " should be --34--.

Signed and Sealed this

Twenty-ninth Day of May, 2007

JON W. DUDAS
*Director of the United States Patent and Trademark Office*